April 28, 1970     R. M. WESTBROOK ET AL     3,508,541

ELECTRODE CONSTRUCTION

Filed Oct. 16, 1967

INVENTORS
RICHARD M. WESTBROOK
JOSEPH J. ZUCCARO

BY

ATTORNEYS

United States Patent Office 3,508,541
Patented Apr. 28, 1970

3,508,541
ELECTRODE CONSTRUCTION
Richard M. Westbrook, Mountain View, and Joseph J. Zuccaro, San Jose, Calif., assignors to the United States of America as represented by the Administrator of the National Aeronautics and Space Administration
Filed Oct. 16, 1967, Ser. No. 676,012
Int. Cl. A61b 5/04
U.S. Cl. 128—2.1                13 Claims

ABSTRACT OF THE DISCLOSURE

An electrode construction for use in detecting low level signals from the skin of living creatures comprising a cap of insulating material attached to a helmet, or the like, to be worn by a subject. An electrode member is carried inside the cap, and a conductor extends through the cap from the electrode member to a contact member at the exterior of the cap. A layer of permeable material, such as compressed powder of AgCl or the like, is located adjacent one surface of the electrode member, and is maintained in position thereat by a rigid permeable member such as a disc of fritted glass. An elongated resilient permeable member, such as a sponge, is carried by the cap and extends from the rigid permeable member, which sponge member is adapted to contact the subject's scalp when the helmet is worn by the subject. An electrolyte permeates the layer of permeable material, the rigid permeable member, and the resilient permeable member to provide an electrical path between the electrode member and the subject's scalp. The rigid permeable member together with the layer of permeable material substantially prevent motion of the electrolyte at the electrode member-electrolyte interface to substantially eliminate motion artifacts. Also, the elongated resilient permeable member is of a tubular shape with the hollow center filled with an electrode paste or gel such as "Redux" which is compatible with the electrolyte employed and the subject's skin.

---

The invention described herein was made by employees of the United States Government and may be manufactured and used by or for the Government for governmental purposes without the payment of any royalties thereon or therefor.

This invention relates to an electrode construction and more particularly to an electrode construction for detecting low level electrical signals from the skin of living creatures.

Electrodes for use in biomedical instrumentation are well known, which electrodes are positioned against the skin of the subject to pick up minute potentials appearing thereat. They commonly are used for obtaining electroencephalographic (EEG) and electrocardiagraphic (ECG) data. EEG signals are in the range of 50 to 100 microvolts whereas ECG signals are in the millivolt range. Because of the very small potentials involved, artifact free EEG data are difficult to obtain. The electrode of this invention which has a low source impedance and is substantially free of motion artifacts, is particularly well adapted for use in obtaining EEG data and is described hereinbelow for such use. However, it will be apparent that other biomedical uses of the electrode are possible, the invention not being limited to the illustrated use.

In the prior art, it is known to support an electrode on a harness or helmet. A specific example of an electrode designed to suppress motion artifacts is the helmet-supported EEG electrode described by Kado, Adey, and Zweizig in an article published in the Proceedings of the 17th Annual Conference on Engineering in Medicine and Biology, p. 5, 1964.

Paste-on type electrodes which are secured to the subject by the use of cement, or the like, generally require a rigorous scalp preparation. Often, they are uncomfortable to wear, and require a relatively long preparation and application time. Consequently, many subjects dislike using such electrodes. The electrode of this invention is adapted to be carried by the helmet worn by the subject, and requires no tedious procedures to apply and results in no discomfort to the subject.

Prior art EEG monitoring systems which function satisfactorily under conditions wherein the subject is under minimum stress and undergoes minimum movement, often fail when used under stressful, dynamic, conditions because of motion artifacts.

An object of this invention is the provision of an improved electrode arrangement which is not subject to the above-mentioned shortcomings of prior art arrangements.

An object of this invention is the provision of a helmet-carried EEG electrode system which is simply applied to the subject's scalp when the helmet is worn, and which is substantially free of motion artifacts.

An object of this invention is the provision of a low source impedance electrode which provides good EEG signal pickup under adverse conditions including conditions wherein the subject is in motion.

The above and other objects and advantages are achieved by an electrode construction which is attached to the helmet of the subject. It includes a cap of insulating material to which an electrode member is attached. A conductor extends from the electrode member and is adapted for connection to electronic amplifying means, carried by the helmet, through cooperating contact members on the cap and helmet.

A layer of permeable material, such as compressed AgCl powder, or the like, is positioned adjacent the electrode member, and is maintained in position thereat by a rigid permeable member such as a disc of fritted glass fixedly mounted in the cap.

A resilient permeable member such as a sponge, is carried by the cap and engages the fritted glass disc. The sponge extends from the cap, and is adapted for engagement with the subject's scalp when the helmet is worn. The sides, but not the ends, of the sponge are coated with a thin layer of silicone rubber, or the like, which adds slightly to the stiffness of the sponge to aid in the penetration thereof between the subject's hair. The sponge is removable and can be disposed of after use.

A saline electrolyte solution is employed which permeates the compressed AgCl powder layer adjacent the electrode member, the fritted glass disc, and the sponge to provide an electrical path between the electrode member and the subject's scalp. The fritted glass disc, compressed AgCl powder, and the electrode member within the cap comprise a rigid integral unit whereby the electrolyte at the electrode member-electrolyte interface undergoes a minimum of disturbance upon movement of the subject. In addition, the sponge is preferably of a tubular shape with the hollow center portion filled with an electrode paste such as "Redux." "Redux" is the trademark of a suitable electrode paste manufactured by the Sanborn Co. of Waltham, Mass. With this arrangement relative motion between the scalp and helmet is possible without altering the electrical properties of the connection beween the sponge and scalp or distorting the signal.

The above and other objects and advantages of the invention will be better understood from the following description when considered in connection with the accompanying drawings. In the drawings wherein like reference characters refer to the same parts in the several views.

Figure 1:
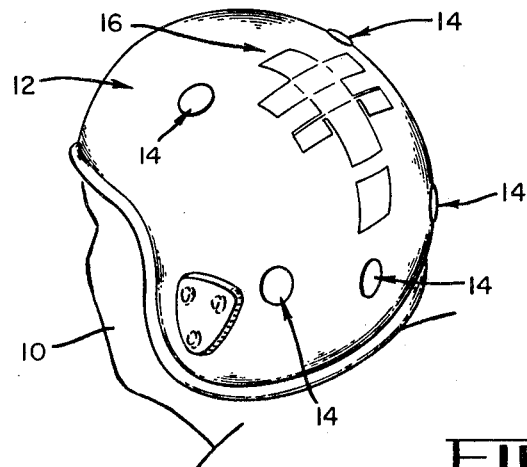
FIGURE 1 is a perspective view showing a subject wearing a helmet which incorporates the electrodes of this invention.

Reference is now made to FIGURE 1 of the drawings wherein there is shown a subject 10 wearing a helmet 12 which carries a plurality of electrode devices 14 embodying this invention. The electrode devices extend through the helmet and contact the subject's scalp, in the manner described below, to pick up the minute potentials thereat. For purposes of illustration only, and not by way of limitation, five electrodes are shown; two pair of which are adapted for connection to the inputs of a pair of differential amplifiers, with the fifth electrode providing an amplifier common connection. The electronic system for radio-telemetering the signals picked up by the electrodes may include differential amplifiers, voltage controlled oscillators, a transmitter, and a battery power supply, all of which may be included within modules, designated 16, carried by the helmet. Details of the electronic circuitry and module construction are not shown and form no part of this invention.

Figure 2:
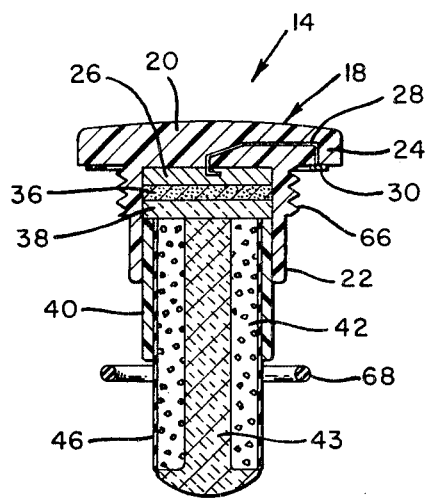
FIGURE 2 is a longitudinal cross-sectional view of an electrode construction according to this invention.

The novel electrode device 14, as best seen in FIGURE 2, comprises a non-porous cap 18 of insulating material in the form of a circular body 20 having a cylindrical radial flange 22 and an annular radial flange, or rim, 24 formed thereon. An electrode element 26 in the form of a circular disc is mounted inside the cap adjacent the body 20, which electrode element is formed of any suitable material. For example, an electrode element comprising an intimately bonded homogeneous mixture of finely divided Ag and AgCl may be used, which elements are well known and require no further description.

Figure 3:
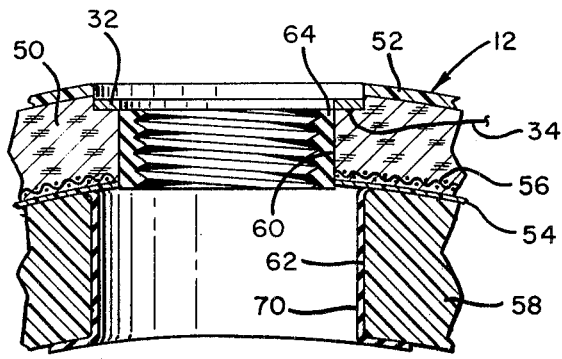
FIGURE 3 is a fragmentary sectional view of a helmet showing the mounting arrangement for the electrode illustrated in FIGURE 2.

The circuit path for connection of the electrode element 26 to the electrical circuit includes a conductor 28 having one end embedded in the electrode element 26. The conductor 28 of silver or other suitable material extends through the body of the cap and connects at the other end to a contact ring 30 formed at the inner face of the rim 24 of the cap. The ring 30 is adapted for contact with a corresponding contact ring 32 (shown in FIGURES 3 and 4) when the electrode device is positioned in the helmet. The second ring 32 is connected by a wire 34 (shown in FIGURE 3) to a differential amplifier included in a module 16.

Returning to a description of FIGURE 2, a layer 36 of permeable material is provided inside the cap in abutting relationship with the electrode member 26. The layer 36 comprises compressed silver chloride powder which is available commercially in block form and is machined to size for use in the electrode arrangement. The compressed powder layer is held in intimate contact with the electrode member 26 by a rigid permeable retaining member 38 which, in turn, is held in position by a retaining sleeve 40, one end of which abuts the member 38. The sleeve is cemented or otherwise suitably attached to the cap flange 22 into which it extends by means not shown. The retainer member 38 may comprise a disc of fritted glass, or the like, which is both rigid and permeable.

The sleeve 40 also serves as a support or holder for an elongated resilient skin engaging member 42. One end of the member 42 abuts the fritted glass disc 38, and the other end is adapted for engagement with the scalp 44 of the subject 10 (FIGURE 4) when the helmet is worn. The member 42 preferably comprises a sponge of cellulose acetate, or the like, which is of a generally tubular shape. The sponge is impregnated and the hollow core is filled with an electrolyte in the form of a gel or paste such as "Redux," mentioned above. A sodium chloride paste 43 is preferred, which paste is physiologically compatible with the subject. A layer 46 of silicone rubber, or the like, may be provided on the outer side wall of the sponge 42 to help retain moisture of the electrolyte 43 therein. The rubber coating also adds a small degree of stiffness to the sponge to facilitate penetration thereof between hair 48 (FIGURE 4) to the scalp. The fritted glass disc 38 and disc 36 of compressed silver chloride powder are wetted, or impregnated with a saline solution, not shown, which is compatible with the electrode paste 43 of sodium chloride. Other type pastes may be used provided they do not contain metallic ions of a different type.

The helmet 12 may comprise a helmet of known design but which has been modified to accommodate the EEG instrumentation of this invention. For example, the helmet shell may comprise a body 50 of cork, plastic, or other suitable material having outer and inner layers 52 and 54 respectively of hard plastic thereon. An electrostatic shield 56 may be included in the shell adjacent the inside wall thereof. A removable liner 58 of plastic or the like, is included inside the shell, and aligned apertures 60 and 62 in the shell and liner, respectively, are provided to accommodate the electrode devices 14. A threaded sleeve 64 is provided in the aperture 60 for engagement with external threads 66 formed on the cap 18. The contact ring 32 is carried on a shoulder formed by an enlarged diameter portion of the hole 60, and when the electrode device is threadedly tightened to the helmet the rings 30 and 32 are brought into tight engagement. A seal ring 68 may be included for moisture sealing engagement between the cap and helmet. Also, a layer 70 of rubber or the like may be included in the aperture 62 to provide a moisture seal thereat. As mentioned above, the leadwire 34 attached to the ring 32 connects to a differential amplifier included in the modules 16 for amplification of the minute signal picked up by the electrode arrangement.

Figure 4:
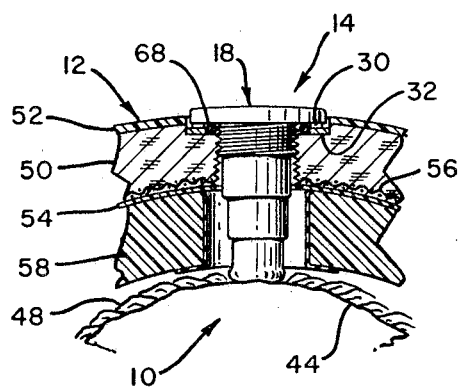
FIGURE 4 is a reduced scale fragmentary cross-sectional view of a helmet showing the electrode secured thereto and engaging the scalp of a subject.

The size of the helmet and liner, and length of the electrodes may be adapted to fit the subject. As seen in FIGURE 4 and noted above, the sponge is slightly compressed in use to provide a light, steady compliance with the scalp. The electrode is simply applied, worn, and removed with substantially no discomfort to the subject. Good, low impedance, contact is obtained even when used on subjects with abnormal amount of hair. Contact area and impedance will vary with each application depending upon such factors as hair tonics, sunburn, hair length, perspiration, and the like. However, such variables do not alter the consistency and quality of the EEG signals.

With this arrangement, the motion potentials due to motion at the electrode-subject interface are substantially eliminated because of compatibility of the ionic structure of the electrode paste and skin. The interface between the sodium chloride electrolyte and silver-silver chloride electrode element also provide a common ionic structure. Furthermore, movement of the electrolyte at the electrode element 26 is substantially prevented by the rigidity of the electrode element 26, compressed AgCl powder 36 and fritted glass disc 38 portion of the electrode device. This construction substantially eliminates mechanical disturbances of the ion gradient at the surface of the electrode member 26. The silver chloride powder is present in large quantities along the entire electrode-member-electrolyte interface. Also, the sodium chloride concentration in the electrolyte is relatively high and constant. This results in a low diffusion rate of ions from the electrode element surface into the adjacent electrolyte solution, thereby maintaining a relatively stable half-cell potential.

The invention having been described in detail in accordance with the requirements of the patent statutes, various changes and modifications may suggest themselves to those skilled in this art, and it will be understood that such changes and modifications shall fall within the

We claim:
1. In an electrode construction for picking up electrical signals from a subject,
an electrode member,
a layer of permeable material adjacent the electrode member,
a rigid permeable member adjacent the layer of permeable material,
means for rigidly securing the electrode member, layer of permeable material and rigid permeable member together to prevent relative movement therebetween, and
means including said layer of permeable material and rigid permeable member for connecting the electrode member to a subject.

2. The electrode construction as defined in claim 1 in which said last-mentioned means includes also a resilient permeable member adjacent the rigid permeable member and adapted to contact a subject from which electrical signals are to be picked up.

3. The electrode construction as defined in claim 2 including electrolyte permeating the layer of permeable material, rigid permeable member and resilient permeable member to electrically connect the electrode member to the subject.

4. The electrode construction as defined in claim 2 wherein the resilient permeable member is of tubular shape, and electrode paste inside the tubular shaped resilient permeable member to render the same conductive.

5. The electrode construction as defined in claim 1 werein the layer of permeable material comprises compressed powder.

6. The electrode construction as defined in claim 5 wherein the compressed powder comprises AgCl.

7. The electrode construction as defined in claim 1 wherein the rigid permeable member comprises fritted glass.

8. The electrode construction as defined in claim 1 wherein the electrode member comprises a highly compressed mixture of Ag and AgCl.

9. The electrode construction as defined in claim 1 wherein the electrode member comprises a highly compressed mixture of Ag and AgCl,
the layer of permeable material comprises compressed AgCl powder, and
the rigid permeable member comprises fritted glass.

10. An electrode construction for use in a helmet for EEG measurements comprising:
a cap of insulation material, said cap being formed with a top and with a cylindrical shaped axial flange depending therefrom,
an electrode member inside the cap adjacent the top,
a conductor attached to the electrode member and extending to the exterior of the cap,
a layer of compressed powder material adjacent one face of the electrode member,
a rigid permeable member inside the cap adjacent the compressed powder layer to maintain the same in contact with the electrode member,
an elongated resilient permeable member engaging the rigid permeable member at one end and adapted for contact with a subject's scalp at the other end, and
electrolyte permeating the layer of compressed powder, rigid permeable member, and elongated resilient permeable member.

11. The electrode construction as defined in claim 10 wherein electrolyte includes a saline solution.

12. The electrode construction as defined in claim 10 wherein the cap is formed with a radial flange, and said conductor is attached to said radial flange.

13. The electrode construction as defined in claim 10 wherein the elongated resilient permeable member is tubular shaped, and including conducting paste inside the tubular shaped delongated member and permeating the same.

References Cited

UNITED STATES PATENTS

| | | | |
|---|---|---|---|
| 2,621,657 | 12/1952 | Leech | 128—417 |
| 2,872,926 | 2/1959 | Aldermen | 128—410 |
| 3,029,808 | 4/1962 | Kagan | 128—2.06 |
| 3,170,459 | 2/1965 | Phipps | 128—2.06 |
| 3,387,608 | 6/1968 | Figar | 128—2.06 |
| 3,411,495 | 11/1968 | Casby | 128—2.1 |

WILLIAM E. KAMM, Primary Examiner